Aug. 11, 1925. 1,549,287
G. BOLANDER
COMBINATION VEHICLE BED AND LUGGAGE CARRIER
Filed Jan. 21, 1924
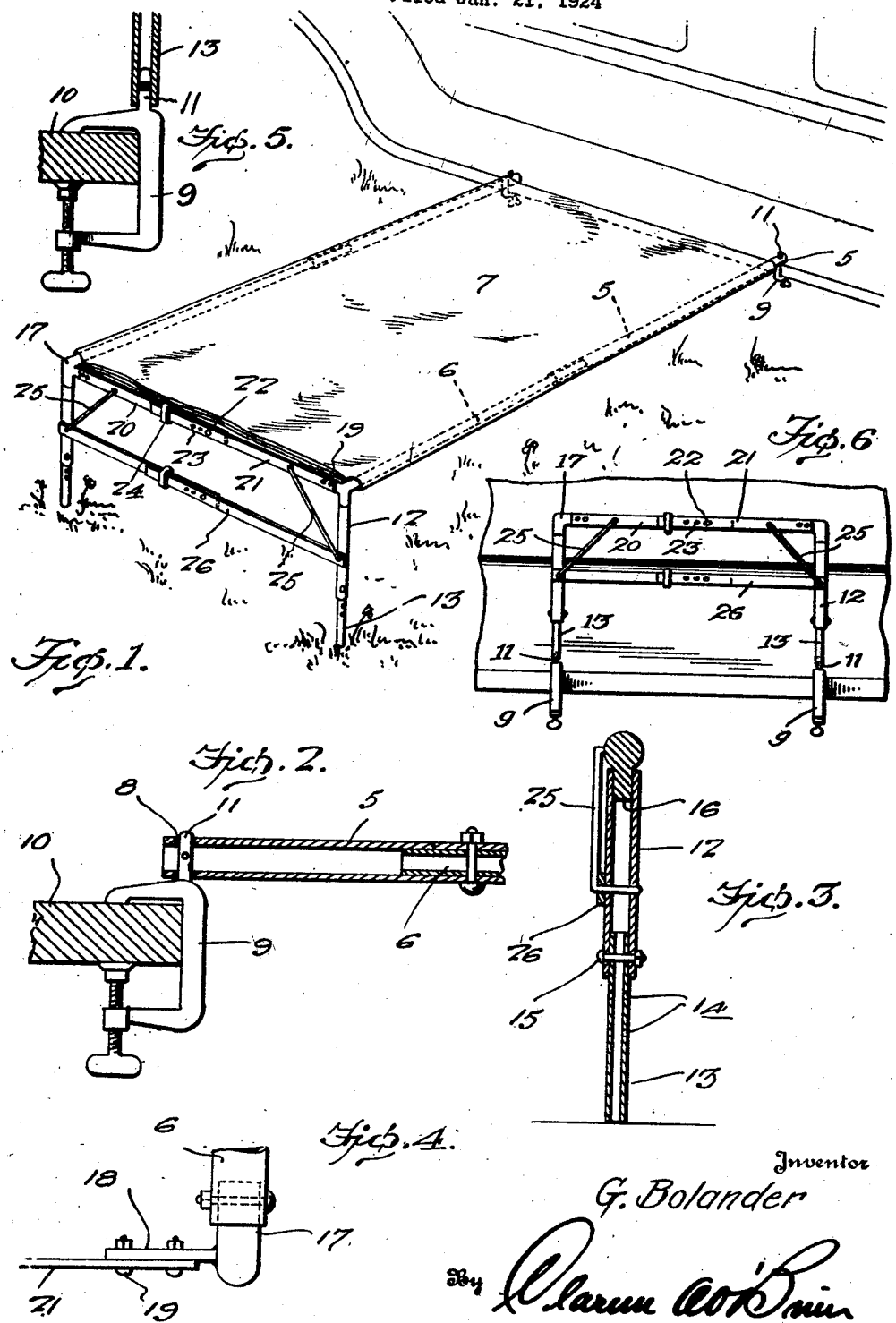

Patented Aug. 11, 1925.

1,549,287

UNITED STATES PATENT OFFICE.

GROVER BOLANDER, OF WEST LOS ANGELES, CALIFORNIA.

COMBINATION VEHICLE BED AND LUGGAGE CARRIER.

Application filed January 21, 1924. Serial No. 687,546.

*To all whom it may concern:*

Be it known that I, GROVER BOLANDER, citizen of the United States, residing at West Los Angeles, in the county of Los Angeles and State of California, have invented certain new and useful Improvements in Combination Vehicle Bed and Luggage Carriers, of which the following is a specification.

This invention relates to a certain new and useful improvement in combination vehicle bed and luggage carrier and has particular reference to a device of this kind wherein one end of the bed is supported by clamping the same to the running board of the vehicle.

The primary object of the invention is to provide a device of the above kind which embraces the desired qualities of simplicity and durability of construction, as well as efficiency in operation.

Another object of the invention is to provide a combination vehicle bed and luggage carrier of the above kind which may be readily set up or knocked down and that may be manufactured and marketed at a low cost.

A still further object of the invention is to provide a device of the above character embodying a removable foot structure unit for the bed embodying supporting legs adapted to be removably associated with clamps which attach the head of the bed to the vehicle running board for forming a luggage carrier whereby the remaining parts of the device may be maintained upon the running board together with any other articles desired.

Further objects are to provide a device of the above kind, the parts of which may be readily adjusted for maintaining the bed bottom in a taut condition, and for collapsing the several parts so as to enable packing of the same within a small amount of space.

Further objects will become apparent as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views:

Figure 1 is a perspective view showing the invention set up to form a bed and with its head end portion operatively associated with the running board of a vehicle.

Figure 2 is an enlarged fragmentary sectional view taken through the running board and one of the side rails of the bed.

Figure 3 is a central longitudinal sectional view through one of the supporting legs of the foot structure and adjacent parts, and Figure 4 is a fragmentary top plan view showing a corner portion of the device shown in Figure 1, adjacent the foot structure.

Fig. 5 is a view like Fig. 2, showing the tubular sections changed from a horizontal to a vertical position.

Fig. 6 is a side elevation of a fragment of the automobile body showing the structure converted to provide a luggage carrier.

Referring more in detail to the drawing, the present invention embodies a pair of side rails of a collapsible nature and preferably embodying telescopically associated tubular sections 5 and 6. These rails are disposed in open ended hems provided at the side edges of a fabric bed bottom 7 of substantially rectangular form and the end section 5 of each side rail is provided at its outer end with transverse openings as at 8. The invention further embodies a pair of screw clamps 9 adapted for rigid engagement with the running board 10 of the vehicle and comprising U-beams, the upper jaws of which are provided with rigid upwardly projecting pins 11, onto which the side rail sections 5 are adapted to be disposed, the pins 11 extending thru the openings 8 at this time.

The invention further embodies a foot structure including a pair of legs composed of telescopically associated and relatively adjustable tubular sections 12 and 13, the lower ends of the sections 12 being provided with transversely aligned openings for selective registration with a desired one of a plurality of transverse openings 14 in the sections 13, whereby the length of the legs may be adjusted and maintained so adjusted by passing bolts 15 through the aligned openings of the leg sections. A pair of three-way castings are employed for facilitating connection of each of the legs with one of the side rails and for facilitating connection of one leg relative to the other and each casting embodies a depending lug 16 removably snugly fitted into the upper end of each upper leg section 12. Each three way casting also embodies a horizontal lug 17 as shown clearly in Figure 4, adapted for being snugly and removably slidably fitted into the adjacent end of the adjacent side rail section 6. Projecting laterally and inwardly from the three-way casting are transversely disposed horizontal lugs 18, to which are removably attached by bolting, as at 19, the ends of a collapsible cross bar, composed of sections 20 and 21, the inner ends of which are overlapped and adjustably connected as at 22 by a removable bolt whereby the sections 20 and 21 may swing in their planes relative to each other. The section 21 is provided with a longitudinal series of openings 23 for selective reception of the pivot bolt 22 whereby the effective length of the cross bar may be varied so that when the sections 20 and 21 are disposed in co-axial or aligned relation as shown in Figure 1, the side rails will be separated sufficient to maintain the fabric bottom 7 in a taut condition. Any suitable means may be provided such as a sliding ring 24 for maintaining the sections 20 and 21 in their aligned or co-axial relation and for the purpose of relieving the legs of lateral tilting strains, inclined braces 25 are provided between the sections 12 of the legs and the end portions of the transverse bar. These braces consist of brace bars with laterally directed ends that are removably positioned in suitable openings provided in the transverse bar, and the leg sections 12.

The lower leg sections 13 are of such size as to be snugly fitted onto the pins 11 of the clamp 9 when the foot structure is detached from the side rails and the fabric bottom carried thereby, whereby an effective luggage carrier is formed. For the purpose of preventing passage of any of the luggage or articles outwardly between the legs and off of the running board when the device is thus used, the lower end portions of the upper leg sections 12 may be connected by means of a further transverse bar 26, the ends of which are provided with openings through which the laterally directed lower ends of the brace rods 25 are passed for maintaining said bar 26 in place.

It is to be understood that the clamp 9 will be tightly clamped upon the running board at the proper distance apart for maintaining the side rails of the bed structure sufficiently spaced so that the fabric bottom 7 will be held under taut condition when the sections 5 of the side rails are engaged with the pins 11 of the clamp 9.

If it is desired to knock down the bed when the same is set up as shown in Figure 1, it is simply necessary to disengage the side rails from the pins 11 and then remove said side rails from the lugs 17 of the three way fittings. The side rails are then collapsed by telescoping one section of the same onto the other, and folding the same with the fabric bottom 7. The remaining parts forming the foot structure of the device are then bodily moved and the lower section 13 of the leg telescopes onto the pins 11 of the clamp 9 so as to form a luggage carrier for retaining the removable parts upon the running board 10. In setting the bed up it is preferable to remove the transverse bar 26 and release the ring 24 so that the sections 20 and 21 may be angularly related for bringing the legs of the foot structure closer together whereupon the side rails are engaged with the lugs 17 of the three way fitting. The sections 20 and 21 are then swung to aligned or co-axial relation and the ring 24 slid into position as shown in Figure 1, so that the side rails are separated and the fabric bottom 7 placed under tension or in taut condition and so held.

From the foregoing description, it is believed that the construction and operation, as well as the advantages of the present invention will be readily understood and appreciated by those skilled in the art.

What I claim as new is:

A device of the class described comprising a pair of duplicate clamps connected to the running board of an automobile, each of said clamps being equipped with an upstanding pin projecting above the top of said running board, a pair of collapsible bed-forming side rails extending horizontally from said running board, said rails being composed of telescopingly connected tubular sections, the inner sections being apertured at their inner ends and said pins projecting through said apertures, a transverse foot unit disposed at the outer ends of said side rails and connecting them together, a fabric bed bottom stretched between said side rails and provided along its opposite longitudinal edges with pockets through and beyond which said side rails extend, the aforesaid foot unit being detachably connected with the outer ends of said rails and comprising a pair of vertically extensible legs connected together by vertically spaced and longitudinally adjustable cross pieces, and diagonal braces connected at their opposite ends with said cross pieces, the lower sections of the aforesaid extensible legs being of tubular cross section, whereby to permit the entire foot unit to be disconnected from said side rails and bodily moved and connected to the aforesaid upstanding pins for providing a luggage carrier.

In testimony whereof I affix my signature.

GROVER BOLANDER.